Feb. 20, 1923.

W. T. IVEY

RIM TOOL

Filed Jan. 6, 1922

1,446,423

W. T. Ivey, INVENTOR

BY Victor J. Evans, ATTORNEY

R. Q. Thomas

WITNESSES

Patented Feb. 20, 1923.

1,446,423

UNITED STATES PATENT OFFICE.

WILLIAM T. IVEY, OF LYONS, GEORGIA.

RIM TOOL.

Application filed January 6, 1922. Serial No. 527,493.

*To all whom it may concern:*

Be it known that I, WILLIAM T. IVEY, a citizen of the United States, residing at Lyons, in the county of Toombs and State of Georgia, have invented new and useful Improvements in Rim Tools, of which the following is a specification.

This invention relates to improvements in tire tools for use in connection with split rims of automobile wheels, whereby the removal and replacing of a tire is facilitated, the present invention being an improvement upon Patent No. 1,388,717, granted to me August 22, 1921.

In the above mentioned patent, the tool included openings disposed upon opposite sides of the rim for the purpose of securing the tool in position for use and as all rims of this character are not provided with these openings, it was of course necessary to bore or otherwise provide such openings before the tool could be used.

This objection is overcome in the present invention by the provision of means for gripping or clamping the rim, the said means being detachably connected to the tool so that the latter may be either used with or without the gripping or clamping means.

Another object of the invention is the provision of a novel form of clamp or grip, which includes a pair of relatively movable members for gripping the bead of the rim, without the necessity of tightly clamping the grips or clamps in place, this gripping action being due to the positions of the clamps or grips, relatively to the pivotal connection of the operating members, which causes the edges of the clamps or grips to bite into the rim and prevent slipping.

With the above and other objects in view, the invention further includes the following novel features and details of construction, to be hereinafter more fully described, illustrated in the accompanying drawings and pointed out in the appended claim.

In the drawings:—

Figure 1:
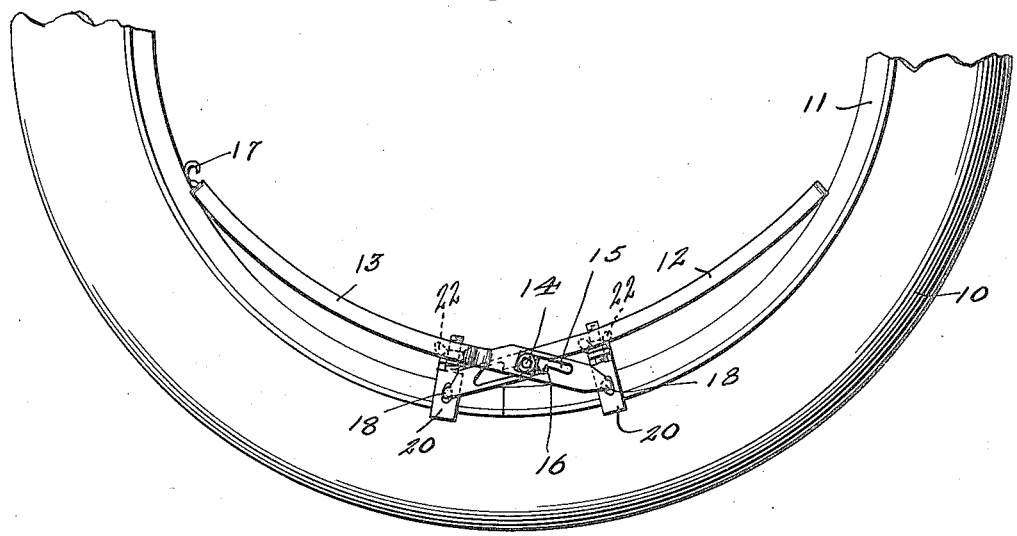
Figure 1 is a side elevation of a fragmentary portion of a tire and rim with the invention applied thereto.
Figure 2:
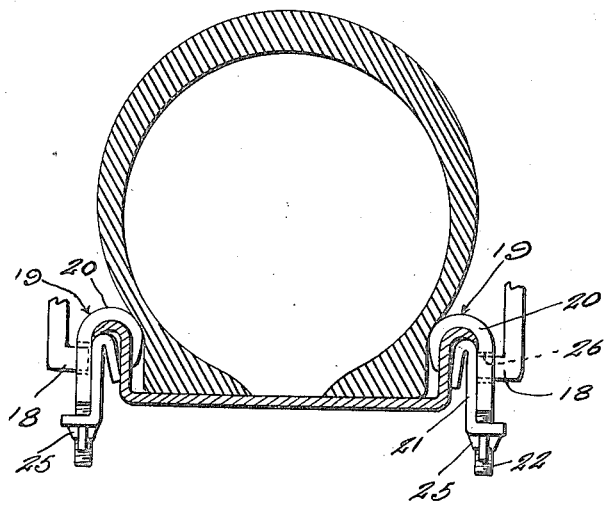
Figure 2 is a transverse sectional view of the tire and rim showing the clamps or grips in position.
Figure 3:
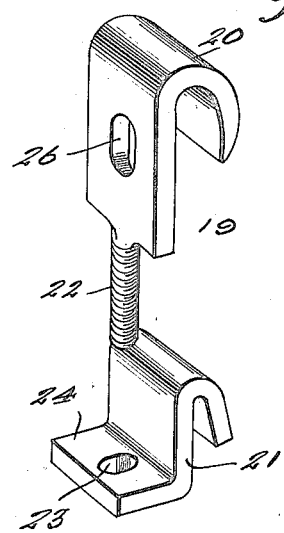
Figure 3 is a detail perspective view of one pair of clamping or gripping elements, the said elements being shown in separated relation.

Referring in detail to the drawings, wherein like characters of reference denote corresponding parts, the invention is illustrated in connection with a tire 10 which is mounted upon a rim 11 of the usual split type.

The tool which comprises the subject matter of the previously mentioned patent includes an inner yoke-shaped member 12 and an outer yoke-shaped member 13. The arms of the members 12 and 13 are arranged parallel, the arms of the last named member being of a greater length than those of the member 12. The members 12 and 13 are pivotally connected together by means of a pivot bar 14, which passes through slots 15 provided in the arms of each member, the said slots having spaced seats 16 for the reception of the pivot bar 14, by means of which the degree of movement or the degree of overlap of the ends of the rim 11 may be regulated, as set forth in my previously granted patent. The member 13 is provided with hooks 17 which are adapted to engage the rim for the purpose of holding the same in contracted position to facilitate the removal and replacement of a tire, the action being such as to lift one end of the rim and lap it over the adjacent end, as will be readily understood.

In my previous patent, the ends of the members 13 were provided with oppositely and inwardly extending studs, indicated at 18 and these studs were shown and described as engaging openings in the rim, but as all rims are not provided with these openings, this was a disadvantage. This disadvantage the present invention overcomes by the provision of clamping elements 19. Four of these elements are provided, one of which is engaged with each arm of each of the members 12 and 13, so that the said elements may be engaged upon opposite sides of the split rim 11 and with each bead of the rim. Each of these elements include a pair of hook-shaped clamps 20 and 21, the first mentioned clamp being adapted to engage over the outer edge of the rim bead, while the last mentioned clamp engages within said bead. The clamp 20 is provided with a threaded shaft 22 which passes through an opening 23 provided in a laterally extending flange 24 of the clamp 21, while a winged nut 25 threadedly engages the clamp 22 and abuts this flange. The clamps 20 are provided with openings 26 for the reception of one of the lugs 18.

In the use of the tool, the clamps are mounted upon the lugs 18 and are secured to the opposite beads of the rim for the adjustment of the winged nuts 25. It is not necessary however to tightly grip the flange of the rim, as the pivotal movement of the clamps with respect to the pivotal connection 14 of the members 12 and 13, causes the edges of the clamps to bite into the bead and prevent slipping. The clamps may be readily detached from the tool so as to permit of the use of the latter in connection with rims having openings for that purpose.

The invention is susceptible of various changes in its form, proportions and minor details of construction and the right is herein reserved to make such changes as properly fall within the scope of the appended claim.

Having described the invention what is claimed is:—

A tool for split rims for vehicles comprising a pair of pivotally connected members and means detachably connected to said members for detachable engagement with the rim upon opposite sides of the split, whereby the members may be moved pivotally to expand and contract the rim, said means each including a pair of hook-shaped clamps, a threaded shank carried by one of said clamps for passage through an opening in the other clamp, a nut engaging the threaded shank for holding the clamps in normal position and means whereby one of the clamps may be engaged with one of the pivoted members.

In testimony whereof I affix my signature.

WILLIAM T. IVEY.